Figure 1:
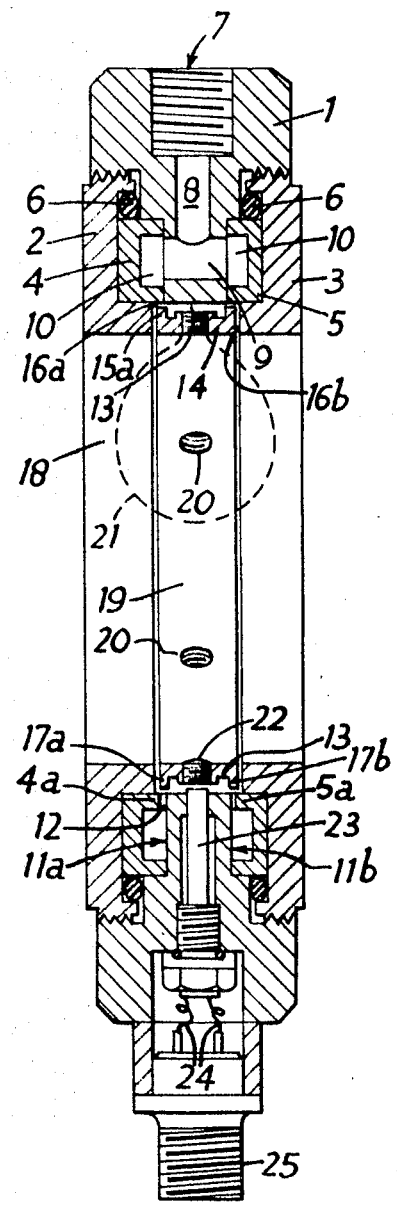

United States Patent

[11] 3,586,397

| [72] | Inventor | Colin W. Dee<br>Wimborne, England |
|---|---|---|
| [21] | Appl. No | 874,346 |
| [22] | Filed | Nov. 5, 1969 |
| [45] | Patented | June 22, 1971 |
| [73] | Assignee | Aerostatic Limited<br>Poole, Dorset, England |
| [32] | Priority | Nov. 22, 1968 |
| [33] | | Great Britain |
| [31] | | 55456/68 |

[54] FLUID BEARINGS
10 Claims, 2 Drawing Figs.

[52] U.S. Cl. ............................................. 308/9
[51] Int. Cl. ............................................. F16c 17/16
[50] Field of Search ........................... 308/9, 418, 417, 91; 73/229

[56] References Cited
UNITED STATES PATENTS
2,474,072  6/1949  Stoner ........................ 308/A Primary Examiner—Fred C. Mattern, Jr.
Assistant Examiner—Frank Susko
Attorney—William Anthony Drucker ABSTRACT: A fluid bearing device comprises a stator having a cylindrical bore and an annular rotor which is disposed in an axially intermediate position along said bore, the stator and the rotor together defining a flow path for fluid through the device, the rotor being supported in the stator by fluid journal bearing means which are disposed wholly radially outwardly of the flow path through the device, the journal bearing means consisting of two distinct fluid bearings which are spaced axially of the rotor.

PATENTED JUN 22 1971  3,586,397

INVENTOR
COLIN W. DEE

FLUID BEARINGS

The invention relates to fluid bearing devices having a stator and an annular rotor together defining a flow path for fluid, and wherein bearing means for the rotor is disposed wholly radially outwardly of the path of flow of fluid through the device.

Such a device may be incorporated in, for example, a flow meter capable of operation on gases, vapors or liquids, and it is desirable that rotor slip shall be made minimal, by ensuring that there is minimal bearing friction.

One way in which bearing friction can be reduced is to make the axial length of the bearing relatively short, i.e. to provide a bearing with a relatively low length-to-diameter ratio.

In U.S. Pat. application Ser. No. 557,231 now U.S. Pat. No. 3,510,175 and in United Kingdom Pat. application No. 48068/67 dated 23rd Oct. 1967 in both of which I am the sole inventor, it is shown that the use of a slot configuration for feed of fluid to the bearing gap permits the obtaining of extremely low length-to-diameter ratios, down to the order of 0.01, and since bearing friction is a function of bearing area, advantage can be taken of axially very "short" bearings.

However, where such a "short" axial dimension of the bearing is associated with a relatively large diameter, there may be certain instabilities, particularly where the bearing is required to operate on a relatively low pressure differential of the order of 5 to 10 p.s.i. Moreover, such a short axial dimension resulting in a narrow rotor cross section may preclude the inclusion of two common disiderata, viz. (1) means for detection of rotor speed, and (ii) and locating and locking in position of fluid-actuated means for drive of the rotor, which may otherwise necessitate use of a greater axial length than is feasible with a bearing having a single row of feed slots.

It is accordingly the first object of the present invention to provide an improved construction of fluid bearing device, of the kind referred to, in which the advantage of relatively very great reduction of length-to-diameter ratio is achievable without correspondingly great loss of stability.

A second object is to provide a construction of rotor wherein both a method of detecting rotor rotation, and the securing within the rotor bore of means for drive thereof are simply achieved.

According to the present invention, in a fluid bearing device which comprises a stator having a cylindrical bore and an annular rotor which is disposed in an axially intermediate position along said bore, and wherein the stator and the rotor together define a flow path for fluid through the device, and wherein the rotor is supported in the stator by fluid journal bearing means which are disposed wholly radially outwardly of the flow path through the device, there is provided the improvement that the fluid bearing means are two distinct fluid bearings which are spaced axially of the rotor. The two fluid bearings are each disposed at preferably the maximum available axial spacing from and preferably symmetrically with respect to the median radial plane of the rotor, to achieve maximum stability, and in proportion to the magnitude of such axial spacing of the two fluid bearings, the axial length of each fluid bearing may be correspondingly reduced without loss of stability.

It is accordingly possible to construct a rotor which is supported in the stator by two individual fluid bearings which are spaced axially by substantially the axial length of the rotor but in each of which fluid bearings the length of the individual bearing gap is relatively very short. With such short bearing gaps, the bearing friction is very much less than would be the case if the whole of the cylindrical external surface of the rotor, of the same axial length, was utilized to provide a fluid bearing. Furthermore, it is found that, using two axially spaced and relatively short bearings, the bearing friction is even less than would be expected from a single fluid bearing of the same axial length as the sum of the two individual bearings. There is accordingly an unexpectedly large gain in friction-reduction, coupled with maintenance of the stability which would be experienced with a single bearing having the axial length of the entire rotor.

A further advantage is obtained in that, as only the actual fluid bearing portions of the rotor need to extend to the diameter of the fluid bearing gaps, the external surface of the portion of the rotor intermediate the bearings can be made of considerably less radius thereby permitting reduction of the moment of inertia of the rotor.

The two axially spaced fluid bearings supporting the rotor may be defined between each external bearing surface of the rotor and an individual internal bearing surface of the stator, or a single relatively longer internal cylindrical surface of the stator may have axially spaced portions which are opposed to and coact with the respect external surfaces of the rotor.

Respective thrust bearing gaps, adjacent to and fed by bleed from each journal bearing, may be defined between the rotor and the stator.

The two separate fluid bearings need not be of the same diameter, and one or both may be frustoconical instead of cylindrical.

The rotor may comprise an annular body, in which preferably the greater part of the mass of the rotor is incorporated, and which is preferably symmetrically disposed with respect to the median radial plane of the rotor, the respective individual journal bearing surfaces being formed on annular shoulders which are carried by and project both axially and radially from the annular body portion.

The rotor, and for example said body portion thereof, may extend radially inwards to a radius less than the radius of the flow path defined by the stator, thereby to provide in the flow path a constriction, similar to a venturi throat, serving to provide a higher fluid pressure upstream of the construction. This higher fluid pressure may be utilized to provide a pressurized fluid feed for fluid bearings which support the rotor in the stator.

Where the rotor is required to carry other constructional elements which project into the path of flow of the fluid through the device, e.g. one or more blades or the like for coaction with the flowing fluid, these may be mounted on the rotor by providing radial bores, e.g. in the body portion. The rotor may also be utilized to carry magnetic metal elements such as slugs used in known manner for obtaining a readout of the rate of rotation of the rotor. Such slugs may likewise be threaded into radial bores provided in the body portion of the rotor. As the body portion can be arranged at a considerably less radius than the bearing surfaces, it can be made of comparatively thick and sturdy construction without thereby unduly increasing the moment of inertia of the rotor, thus permitting very firm mounting of the constructional elements and such readout slugs.

Figure 2:
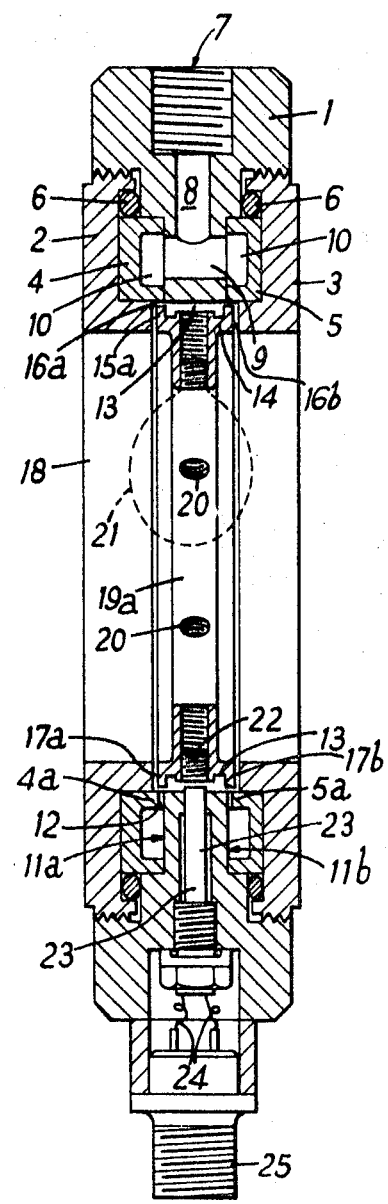

In order that the nature of the invention may be readily ascertained, two embodiments of fluid flow meter incorporating some of the features thereof are hereinafter particularly described with reference to the accompany drawing, in which:

FIG. 1 is an axial central section of a first embodiment;
FIG. 2 is an axial central section of a second embodiment.

In both embodiments, the flow meter consists of a stator, a rotor supported in the stator by fluid bearings, blade means on the rotor to coact with a fluid flow, and means on the rotor and stator to obtain readout of the rotation of the rotor.

The stator consists of an annular outer member 1 which is bored and threaded from each end to receive a pair of identical annular end members 2 and 3. The outer member 1 is stepped to provide a pair of opposed faces against each of which there is disposed a respective C-section element 4 or 5. A resilient O-ring 6 is provided to ensure a fluidtight seal between each end member and the outer member 1.

The outer member 1 has a threaded inlet opening 7 to receive a union connection from any convenient source of bearing fluid under pressure. The opening 7 communicates with a radial bore 8 opening at its inner end into a coaxial passage 9 which communicates with the respective annular recesses 10 of the two C-section elements 4 and 5. The radially inner leg 4a or 5b of the elements 4 and 5 is cut back axially, at a plurality of positions spaced symmetrically about the axis, so as to provide a plurality of parallel-sided recesses. As the legs 4a and 5a are butted up against the opposed plane radial faces 11a and 11b of the outer member 1, there are formed a corresponding plurality of radial feed slots 12 each of which open at its outer end into a respective recess 10 and at its inner end into a general bearing recess 13 within the stator.

In the recess 13 there is disposed, with both radial and axial clearance, a rotor comprising a central body portion 14 on which are formed shoulders 15a and 15b which each project both axially and radially outwards from the body portion 14. On the shoulders 15a and 15b there is formed an outer cylindrical surface which, together with the opposed portion of the internal cylindrical surface of the recess 13 of the stator, defines a respective bearing gap 16a and 16b. Each of the journal bearings is relatively short compared with the axial length of the rotor, say about 0.2 thereof, and the bearings are spaced axially by substantially the entire length of the rotor.

Between the axial end face of each of the shoulders 15a and 15b, and the opposed axial faces of the recess 13 there are formed respective thrust bearing gaps 17a and 17b which are each fed with bearing fluid under pressure by bleed from the adjacent journal bearing gaps. The bearing fluid is allowed to exhaust into the main flow path 18 of the stator.

In FIG. 1, the internal circumference 19 of the rotor is of the same radius as the bore of the stator, and forms a smooth and stepless continuation thereof.

In FIG. 2, the body portion 14 of the rotor extends radially inwards into the flow path to provide a ring having an inner cylindrical surface 19a. This ring provides a constriction in the flow path through the device, and acts in a similar manner to a venturi throat. In each embodiment, the rotor is also bored and threaded radially at 20 for the reception of the threaded stem of a blade 21 (shown in broken line) adapted to coact with the fluid flow through the device. In others of the bores 20 there are inserted slugs 22 of a magnetic metal to coact with a magnetically sensitive element 23 mounted in the outer member 1 and having wires 24 connected to an output socket 25.

The rotor is supported, against axial thrusts, by the thrust bearings having the respective gaps 17a and 17b. It is supported against radial loads by the journal bearings having the respective gaps 16a and 16b. The axial stability of the rotor is ensured by the wide axial spacing of the gaps 16a and 16b, and it is found in practice that the bearing friction of the two journal bearings is less than would be expected with a single bearing of a length which was the sum of the lengths of the gaps 16a and 16b.

Although the two main portion of the bearing have been referred to throughout as the stator and the rotor, it will be well known to those skilled in this art that the roles can often be reversed, and this description and the following claims are to be interpreted accordingly.

I claim:

1. A fluid bearing device comprising a stator having a cylindrical bore, an annular rotor disposed in said stator at a position which is axially intermediate the ends of said bore, said stator and said rotor together defining a flow path for fluid through the device, said rotor being supported in said stator by two distinct fluid journal bearings spaced axially of the rotor and disposed wholly radially outwardly of said fluid flow path through the device.

2. A fluid bearing device, as claimed in claim 1, wherein said two distinct fluid journal bearings are disposed respectively one at each axial extremity of said rotor.

3. A fluid bearing device, as claimed in claim 1, wherein said two distinct fluid journal bearings are disposed symmetrically one at each side of the median radial plane of said rotor.

4. A fluid bearing device, as claimed in claim 1, wherein the length-to-diameter radio of each of said fluid journal bearings is not greater than 0.1.

5. A fluid bearing device, as claimed in claim 1, wherein said rotor has an external surface disposed axially between said two distinct fluid journal bearings and of lesser radius than said fluid journal bearings.

6. A fluid bearing device, as claimed in claim 1, wherein said stator and said rotor define two fluid axial-thrust bearing gaps each of which communicates with a respective one of said two distinct fluid journal bearings.

7. A fluid bearing device, as claimed in claim 1, wherein said rotor comprises an annular body and two annular shoulders which project axially and radially from said annular body, said shoulders each having a bearing surface serving to define with said stator a respective one of said two distinct fluid journal bearings.

8. A fluid bearing device, as claimed in claim 1, comprising means carried by said rotor and projecting into said path to coact with said flow of fluid through the device.

9. A fluid bearing device, as claimed in claim 1, comprising magnetic means carried by said rotor.

10. A fluid bearing device, as claimed in claim 1, wherein said rotor comprises an internal surface of less radius than the radius of said bore of said stator.